US007925399B2

(12) United States Patent
Comeau et al.

(10) Patent No.: US 7,925,399 B2
(45) Date of Patent: Apr. 12, 2011

(54) METHOD AND APPARATUS FOR TESTING VEHICLE EMISSIONS AND ENGINE CONTROLS USING A SELF-SERVICE ON-BOARD DIAGNOSTICS KIOSK

(75) Inventors: David Arthur Comeau, Sussex, WI (US); Timothy E. Schwantes, Sussex, WI (US); Timothy J. Raml, Pewaukee, WI (US); Gregory A. Werner, Hartford, WI (US); Mark J. Werner, Sussex, WI (US); Victor E. McCartney, Brown Deer, WI (US); William D. Nicholson, Waukesha, WI (US)

(73) Assignee: Applus Technologies, Inc., Chicago, IL (US)

( * ) Notice: Subject to any disclaimer, the term of this patent is extended or adjusted under 35 U.S.C. 154(b) by 564 days.

(21) Appl. No.: 11/535,464

(22) Filed: Sep. 26, 2006

(65) Prior Publication Data

US 2007/0083306 A1 Apr. 12, 2007

Related U.S. Application Data

(60) Provisional application No. 60/596,470, filed on Sep. 26, 2005.

(51) Int. Cl.
*G01M 17/00* (2006.01)

(52) U.S. Cl. .......................................... 701/33; 701/29

(58) Field of Classification Search .................... 701/29, 701/30, 33
See application file for complete search history.

(56) References Cited

U.S. PATENT DOCUMENTS

| | | | | | |
|---|---|---|---|---|---|
| 4,754,519 | A | | 7/1988 | Duran et al. | |
| 4,757,463 | A | * | 7/1988 | Ballou et al. | 701/35 |
| 4,956,783 | A | * | 9/1990 | Teranishi et al. | 700/111 |
| 4,970,655 | A | | 11/1990 | Winn et al. | |
| 5,055,657 | A | | 10/1991 | Miller et al. | |
| 5,343,906 | A | | 9/1994 | Tibbals, III | |
| 5,874,722 | A | * | 2/1999 | Rando et al. | 235/472.01 |
| 5,978,495 | A | * | 11/1999 | Thomopoulos et al. | 382/124 |
| 6,064,970 | A | * | 5/2000 | McMillan et al. | 705/4 |
| 6,363,299 | B1 | * | 3/2002 | Hartsell, Jr. | 700/244 |
| 6,381,514 | B1 | * | 4/2002 | Hartsell, Jr. | 700/236 |
| 6,449,142 | B1 | * | 9/2002 | Wu | 361/679.08 |
| 6,466,842 | B1 | * | 10/2002 | Hartsell, Jr. | 700/231 |
| 6,522,947 | B1 | * | 2/2003 | Hartsell, Jr. | 700/241 |

(Continued)

OTHER PUBLICATIONS

State of Oregon, Department of Administrative Services (DAS), Request for Proposal #102-7505-4; Motor Vehicle Inspection System Upgrade for the Department of Environmental Quality (DEQ); Dec. 6, 2004; 51 pages.

(Continued)

*Primary Examiner* — Khoi Tran
*Assistant Examiner* — Kyung Kim
(74) *Attorney, Agent, or Firm* — Polsinelli Shughart PC

(57) ABSTRACT

In a method and apparatus for testing vehicle emissions and engine control components using a self-service on-board diagnostics (OBD) kiosk, a stand-alone kiosk includes a computing device capable of gathering VIN information and OBD information from a vehicle using a VIN reader and OBD reader. The kiosk generates a readable display or printed report for the kiosk operator indicating any detected diagnostic trouble codes found during the OBD test. By networking a plurality of kiosks together in a secure network and accessible to the Internet, an OBD kiosk network maintains a centrally located vehicle interface database for storing and retrieving pertinent vehicle-related information during OBD testing.

15 Claims, 7 Drawing Sheets

U.S. PATENT DOCUMENTS

| | | | | |
|---|---|---|---|---|
| 6,529,808 | B1 * | 3/2003 | Diem | 701/29 |
| 6,604,033 | B1 | 8/2003 | Banet et al. | |
| 6,611,740 | B2 * | 8/2003 | Lowrey et al. | 701/29 |
| 6,636,790 | B1 | 10/2003 | Lightner et al. | |
| 6,732,031 | B1 | 5/2004 | Lightner et al. | |
| 6,732,032 | B1 | 5/2004 | Banet et al. | |
| 6,775,602 | B2 | 8/2004 | Gordon, Jr. et al. | |
| 6,810,309 | B2 * | 10/2004 | Sadler et al. | 701/1 |
| 6,816,760 | B1 | 11/2004 | Namaky | |
| 6,822,582 | B2 | 11/2004 | Voeller et al. | |
| 6,868,386 | B1 * | 3/2005 | Henderson et al. | 705/4 |
| 6,879,894 | B1 | 4/2005 | Lightner et al. | |
| 6,928,348 | B1 | 8/2005 | Lightner et al. | |
| 6,977,612 | B1 * | 12/2005 | Bennett | 342/357.46 |
| 7,031,828 | B1 * | 4/2006 | Thompson et al. | 701/114 |
| 7,089,099 | B2 * | 8/2006 | Shostak et al. | 701/32 |
| 7,107,220 | B2 * | 9/2006 | Novack et al. | 704/273 |
| 7,469,171 | B2 | 12/2008 | Tefft et al. | |
| 2002/0007237 | A1 | 1/2002 | Phung et al. | |
| 2002/0123833 | A1 | 9/2002 | Sakurai et al. | |
| 2002/0138185 | A1 | 9/2002 | Trsar et al. | |
| 2003/0130774 | A1 | 7/2003 | Tripathi et al. | |
| 2003/0174256 | A1 * | 9/2003 | Kim et al. | 349/1 |
| 2003/0176957 | A1 * | 9/2003 | Namaky et al. | 701/29 |
| 2003/0204290 | A1 * | 10/2003 | Sadler et al. | 701/1 |
| 2004/0039509 | A1 * | 2/2004 | Breed | 701/45 |
| 2004/0041689 | A1 * | 3/2004 | DeBono | 340/5.52 |
| 2004/0125993 | A1 | 7/2004 | Zhao et al. | |
| 2004/0130442 | A1 * | 7/2004 | Breed et al. | 340/443 |
| 2004/0227523 | A1 | 11/2004 | Namaky | |
| 2005/0043868 | A1 | 2/2005 | Mitcham | |
| 2005/0182537 | A1 * | 8/2005 | Tefft et al. | 701/29 |
| 2005/0192705 | A1 * | 9/2005 | Pinney et al. | 700/241 |
| 2005/0192727 | A1 * | 9/2005 | Shostak et al. | 701/37 |
| 2006/0025897 | A1 * | 2/2006 | Shostak et al. | 701/1 |
| 2006/0036442 | A1 * | 2/2006 | Novack et al. | 704/273 |
| 2006/0227366 | A1 * | 10/2006 | Hohensee et al. | 358/1.15 |
| 2006/0255967 | A1 | 11/2006 | Woo et al. | |
| 2007/0038434 | A1 * | 2/2007 | Cvetko | 703/23 |
| 2007/0083306 | A1 | 4/2007 | Comeau | |

OTHER PUBLICATIONS

State of Oregon, Department of Environmental Quality Memo; Subject: Agenda Item C, Rule Adoption: On-Road Clean Screening and Self-Testing of Vehicles, Oct. 9-10, 2003 EQC Meeting; Sep. 18, 2003; 45 pages.

Notice of Proposed Rulemaking, Vehicle Inspection Program Rule Proposal—On-Road Clean Screening and Self-Service Testing of Vehicles, State of Oregon, Department of Environmental Quality, Apr. 15, 2003; 55 pages.

Transportation Systems Branch Environment Canada, On-Board Diagnostics II (OBDII) and Light-Duty Vehicle Emission Related Inspection and Maintenance (I/M) Programs, Apr. 2004; 92 pages.

United States Environmental Protection Agency, Air and Radiation, Performing Onboard Diagnostic System Checks as Part of a Vehicle Inspection and Maintenance Program, Jun. 2001, 37 pages.

International Search Report and Written Opinion for PCT/US10/36988, dated Jul. 28, 2010 (7 pages).

* cited by examiner

100

200

200

500

600

METHOD AND APPARATUS FOR TESTING VEHICLE EMISSIONS AND ENGINE CONTROLS USING A SELF-SERVICE ON-BOARD DIAGNOSTICS KIOSK

CROSS-REFERENCE TO RELATED APPLICATION

This application claims the benefit of and priority from to the provisional patent application having Application No. 60/596,470, filed Sep. 26, 2005 by David Arthur Comeau, for a Method and Apparatus for Testing Vehicle Emissions and Engine Controls Using a Self-Service On-Board Diagnostics Kiosk.

FIELD OF THE INVENTION

The invention generally relates to vehicle emissions and engine control testing equipment and more particularly to a self-service on-board diagnostics kiosk and network for testing vehicle emissions and engine controls.

BACKGROUND OF THE INVENTION

During the 1970s and 1980s, vehicle manufacturers began to use electronic systems to control engine functions and diagnose engine problems in an attempt to meet federal emissions standards set up by the Environmental Protection Agency (EPA). In the mid-1980's, the California Air Resources Board (CARB) approved a set of regulations requiring vehicles to be equipped with On-Board Diagnostic (OBD) systems to control and regulate emission and engine-control related components. The OBD system included circuitry and other electromechanical components that recorded engine and emission-related malfunctions using diagnostic trouble codes (DTCs). Stored in memory, the DTCs could later be retrieved by technicians to quickly determine the direct cause of the malfunctions and make necessary repairs.

OBD systems installed on vehicles included, among other things, an engine control module that monitored the engine controls and emission related components, a malfunction indicator lamp (MIL) located on an instrument panel and other supporting circuitry and memory. When a malfunction was detected by the OBD system, the MIL illuminated to provide notice to the vehicle operator of an engine or emissions malfunction. At the same time, the OBD system stored in memory the DTCs corresponding to the specific malfunction detected.

In addition to standard tailpipe testing equipment which measured exhaust output and content, state emission testing facilities were subsequently equipped with OBD-equipment that connected to the OBD system of a vehicle and retrieved stored DTCs by way of a data link connector (DLC). As a consequence, inspection and maintenance programs could quickly and efficiently determine whether a vehicle's specific engine control and emission system was functioning normally. For instance, to detect whether the engine control system of the OBD was functioning normally, an inspector could perform a standard key on engine off (KOEO) test by examining the responsiveness of the MIL under KOEO conditions. By retrieving the DTCs stored by OBD systems, an inspector could similarly review a history of generated trouble codes and diagnose the vehicle's road-worthiness.

In the late 1980's and early 1990's California developed and approved a new set of regulations, a second generation OBD system (OBD-II) for use in newly manufactured vehicles. OBD-II built upon the first generation OBD system and incorporated various technical advancements including, among other things, the ability to monitor engine misfires and catalysts efficiencies. Although the first and second generation of OBD regulations were originally only required in California, Federal emission regulations quickly followed. Operating under the framework of the Clean Air Act of 1990, the EPA adopted California's OBD-II regulations in the mid-1990s and required certain vehicles manufactured in 1996 and later to be equipped with OBD-II systems. In addition to requiring OBD-II systems, the Clean Air Act requires states to perform vehicle checks of OBD-II systems by way of mandatory programs which read generated DTCs and indicate whether the vehicle is safe and robust in terms of today's emission control standards. As of 1998, the EPA adopted new Federal OBD-II standards based on California's OBD-II regulations for certain newly manufactured vehicles.

Prior to adoption of the Federal standards, states typically utilized standard tailpipe testing equipment to evaluate and determine whether the exhaust volume and content met prescribed limits. Unlike traditional tailpipe testings, mandatory inspection and maintenance programs using OBD-II systems look for broken or malfunctioning emissions control components and detect potential or existing malfunctions before it leads to higher vehicle emissions. As a result, OBD-II technology benefits motorists, repair technicians and the environment. Motorists benefit because it monitors vehicle's performance each time the vehicle is driven and immediately identifies problems, allowing service to be performed before serious problems develop. Repair technicians benefit because it enables them to accurately and quickly diagnose problems by downloading DTCs vis-a-vis a data link connector (DLC). Lastly, because the OBD-II system identifies problems that cause increased vehicle emissions, the environment benefits from a lack of pollutants.

As emission and engine maintenance technology has improved from the 1970s to the present, Federal and state governments have adopted new technologies to measure vehicle emissions and keep our vehicles cleaner and safer. As a result of first and second generation OBD systems, tailpipe analyzer tests and legacy equipment are no longer required for vehicles manufactured in 1996 and later. While emissions testing has become standard across the United States, state-run facilities generally include complicated testing protocols and methodologies and expensive and mandated ancillary equipment to read and interpret DTCs. While individual vehicle owners may utilize state-run facilities to receive feedback based upon their vehicle's emissions and engine performance, the inspection and maintenance programs are generally not required for each vehicle until a vehicle reaches a prescribed age. Because state facilities are generally not available to the casual user or are inconveniently located, private manufacturers have marketed custom software and hardwired OBD testing equipment. While vehicle owners no longer need to visit state-run facilities to perform engine and emissions tests, the equipment sold by private manufacturers is neither economical, streamlined or user-friendly. Therefore, a need exists for OBD testing equipment which features state-of-the-art equipment allowing user-friendly testing processes to encourage self-service testing practices among vehicle owners and/or trained vehicle inspectors.

It is further noted that current OBD testing equipment has few, if any, security systems in place to prevent fraudulent reporting of engine and emissions data and thus is susceptible to abuse. Accordingly, a further need exits for OBD testing equipment having security and/or tamper-resistant features designed to alleviate this problem.

BRIEF DESCRIPTION OF THE DRAWINGS

The invention will be more readily understood in view of the following description when accompanied by the below figures and wherein like reference numerals represent like elements.

DETAILED DESCRIPTION OF A PREFERRED EMBODIMENT

The present disclosure relates to a method and apparatus for testing vehicle emissions and engine controls using a self-service OBD kiosk. In the following detailed description, numerous specific details are set forth in order to provide a thorough understanding of the disclosure. It will be apparent to one of ordinary skill in the art, however, that these specific details need to not be used to practice the presently disclosed method and apparatus. In other instances, well-known structures, interfaces and processes have not been shown in detail in order not to unnecessarily obscure the present invention.

Figure 1:
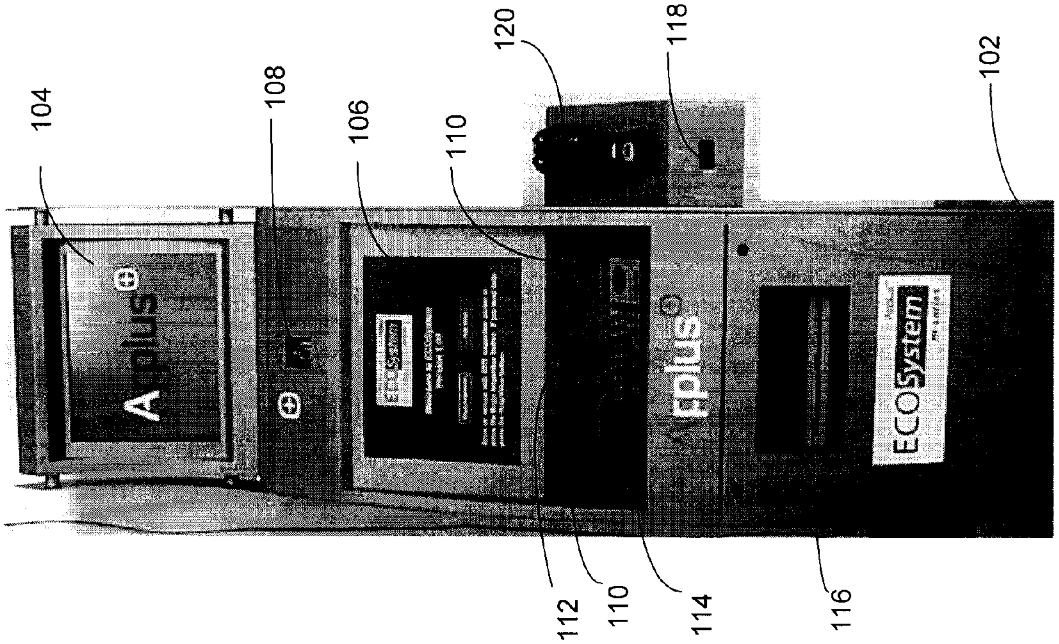
FIG. 1 is a perspective view of one embodiment of a self-service OBD kiosk.

FIG. 1 illustrates a self-service OBD kiosk 100 including a standalone cabinet 102 having a first monitor 104, a second monitor 106, a camera 108, a speaker system 110, a payment information collector 112, a manual input device 114, a printer 116, an OBD reader 118, a VIN reader 120 and a computing device 400 (FIG. 4) contained within standalone cabinet 102. The standalone cabinet 102 enables OBD kiosk 100 to be portable and may therefore be placed in any suitable location or environment. In one embodiment, standalone cabinet 102 is a waterproof cabinet capable of repelling moisture and water and may also contain a climate and/or temperature-controlled system (e.g., at least one: of an internal heater and an air condition unit) capable of keeping its components at a suitable temperature or humidity under one or more adverse conditions. Although illustrated with each of the components listed above, one having ordinary skill in the art will recognize that one or more of the components may be optional. In one embodiment, self-service OBD kiosk 100 may only include one of: first monitor 104 and second monitor 106. In another embodiment, self-service OBD kiosk 100 may not include at least one of: speaker system 100, payment information collector 112, printer, OBD reader 118, and VIN reader 120. It is recognized that OBD kiosk 100 may therefore be tailored to suit the needs of its intended audience or customer base. For instance, if the intended audience is vehicle owners, payment information collector 112 may be particularly useful to collect payment from each vehicle owner. The opposite may be true if the intended audience is trained vehicle inspectors.

Figure 2:
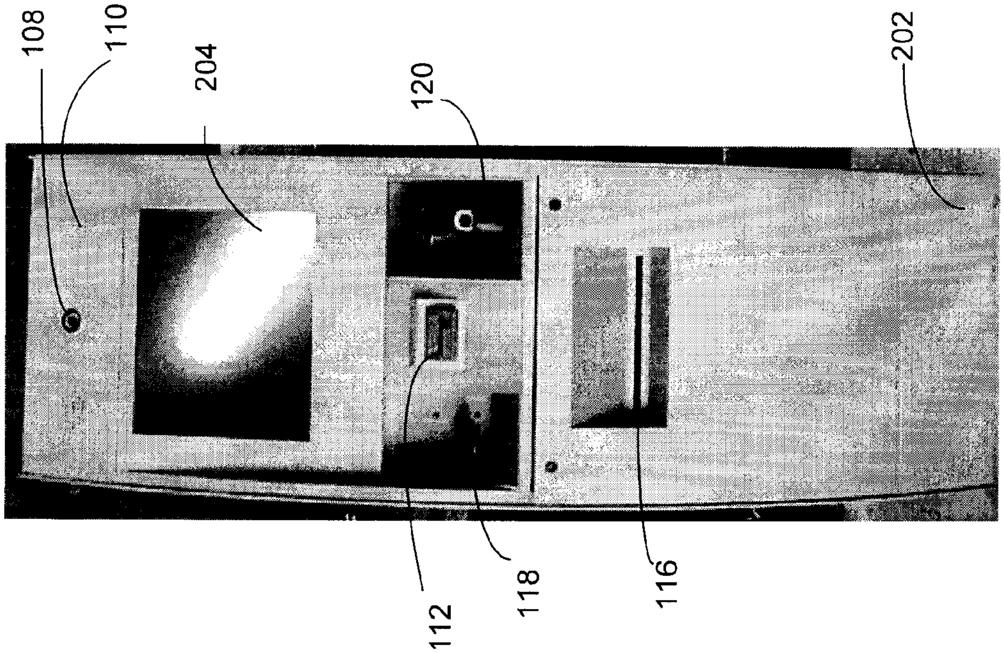
FIG. 2 is a perspective view of a second embodiment of a self-service OBD kiosk.

FIG. 2 illustrates another embodiment of a self-service OBD kiosk 200 including a standalone cabinet 202 having an integrated monitor and manual input device 204, camera 108, speaker system 110, payment information collector 112, printer 116, OBD reader 118, VIN reader 120 and computing device 400 (FIG. 4) contained within standalone cabinet 202. The standalone cabinet 102 enables OBD kiosk 100 to be portable and may therefore be placed in any suitable location or environment. In one embodiment, standalone cabinet 202 is a waterproof cabinet capable of repelling moisture and water and may also contain a climate and/or temperature-controlled system as discussed above with respect to FIG. 1. Similar to the self-service OBD kiosk 100 of FIG. 1, the self-service OBD kiosk 200 may be constructed with less than each component listed above. In one embodiment, self-service OBD kiosk 200 may not include at least one of: speaker system 100, payment information collector 112, printer, OBD reader 118, and VIN reader 120. Although not illustrated, it is recognized that OBD kiosk 200 may further include an additional manual input device such as manual input device 114 of FIG. 1. It is recognized that OBD kiosk 200 may therefore be tailored to suit the needs of its intended audience or customer base.

Figure 3:
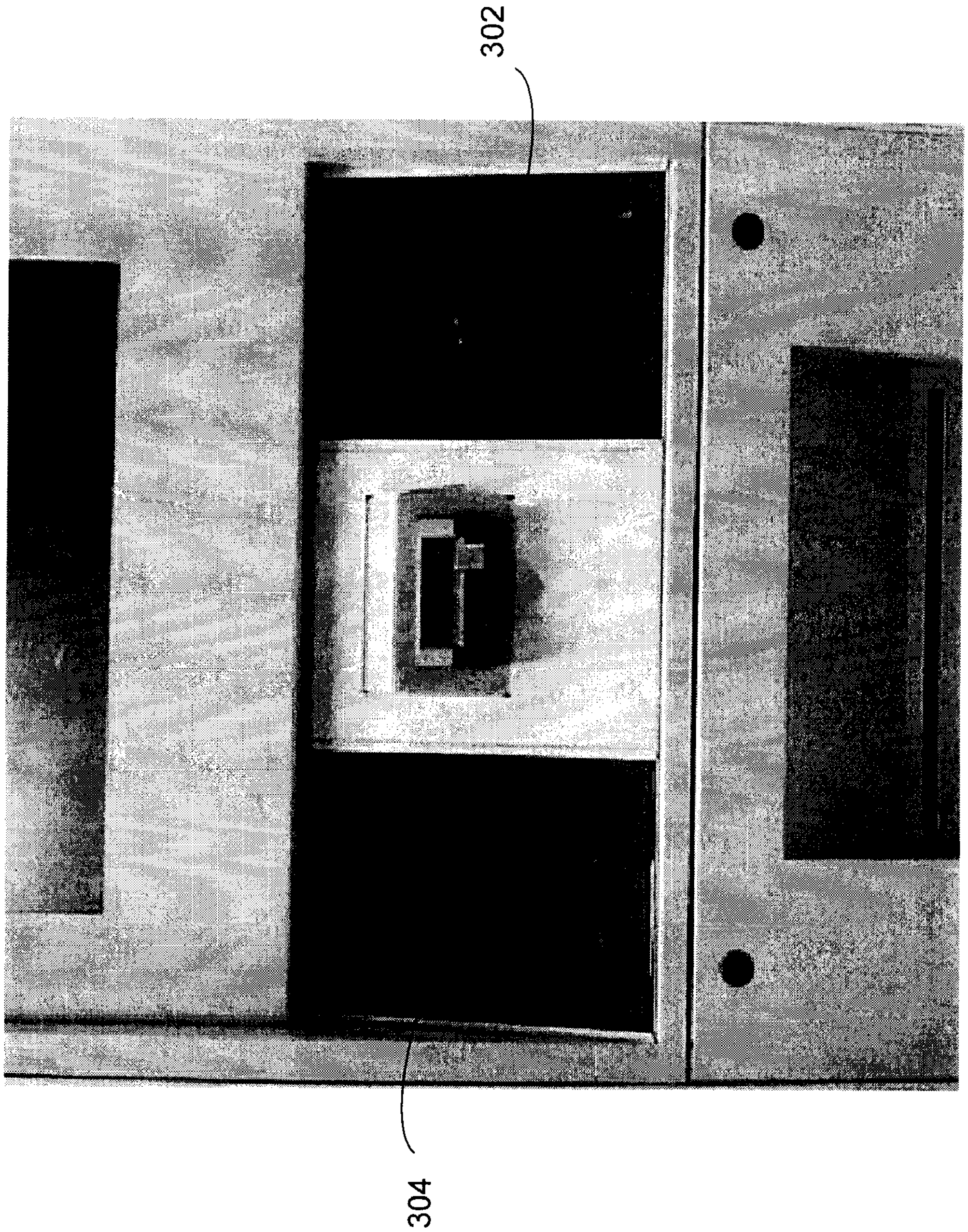
FIG. 3 is a perspective view of the self-service OBD kiosk of FIG. 2 illustrating the security doors shielding the OBD reader and the VIN reader in accordance with one embodiment of the present disclosure.

FIG. 3 is a perspective view of the self-service OBD kiosk of FIG. 2 illustrating security doors 302, 304 shielding the OBD reader 118 and the VIN reader 120 in accordance with one embodiment of the present disclosure. First security door 302 and second security door 304 shield OBD reader 118 and VIN reader 120, respectively. As recognized by one having ordinary skill in the art, first security door 302, second security door 304 are associated with corresponding mechanisms that enable security doors 302, 304 to be selectively opened and closed. The selective opening and closing of security doors 302, 304 may be controlled by any suitable device and may be designed to open and close in any suitable direction. In one embodiment, computer system 400 is responsible for the selective opening and closing of security doors 302, 304. As further recognized, security doors 302, 304 are capable of both providing the OBD kiosk 200 (and one more components thereof) with additional security and/or with additional protection from adverse external conditions (e.g., weather).

In one embodiment, first door 302 is selectively opened after at least one of: user identification and user payment information collection. With first door 302 open, a user may use VIN reader 120. After VIN decoder 120 has been returned, first door 302 is selectively closed. VIN reader 120 may include a holster equipped with a sensor capable of detecting return of the VIN reader 120. Alternatively, kiosk 200, via integrated monitor and manual input device 204, may prompt the user to confirm receipt of the VIN reader 120. As first door 302 is selectively closed, second door 304 is selectively opened for access to OBD reader 118. Upon return of the OBD reader 118, the second door 304 is selectively closed. OBD reader 118 may similarly include a holster equipped with a sensor capable of detecting return of the OBD reader 118. Alternatively, kiosk 200, via integrated monitor and manual input device 204, may prompt the user to confirm receipt of the OBD reader 118. In this manner, the selective opening and closing of first and second doors 302-304 appear automatic to the user.

Figure 4:
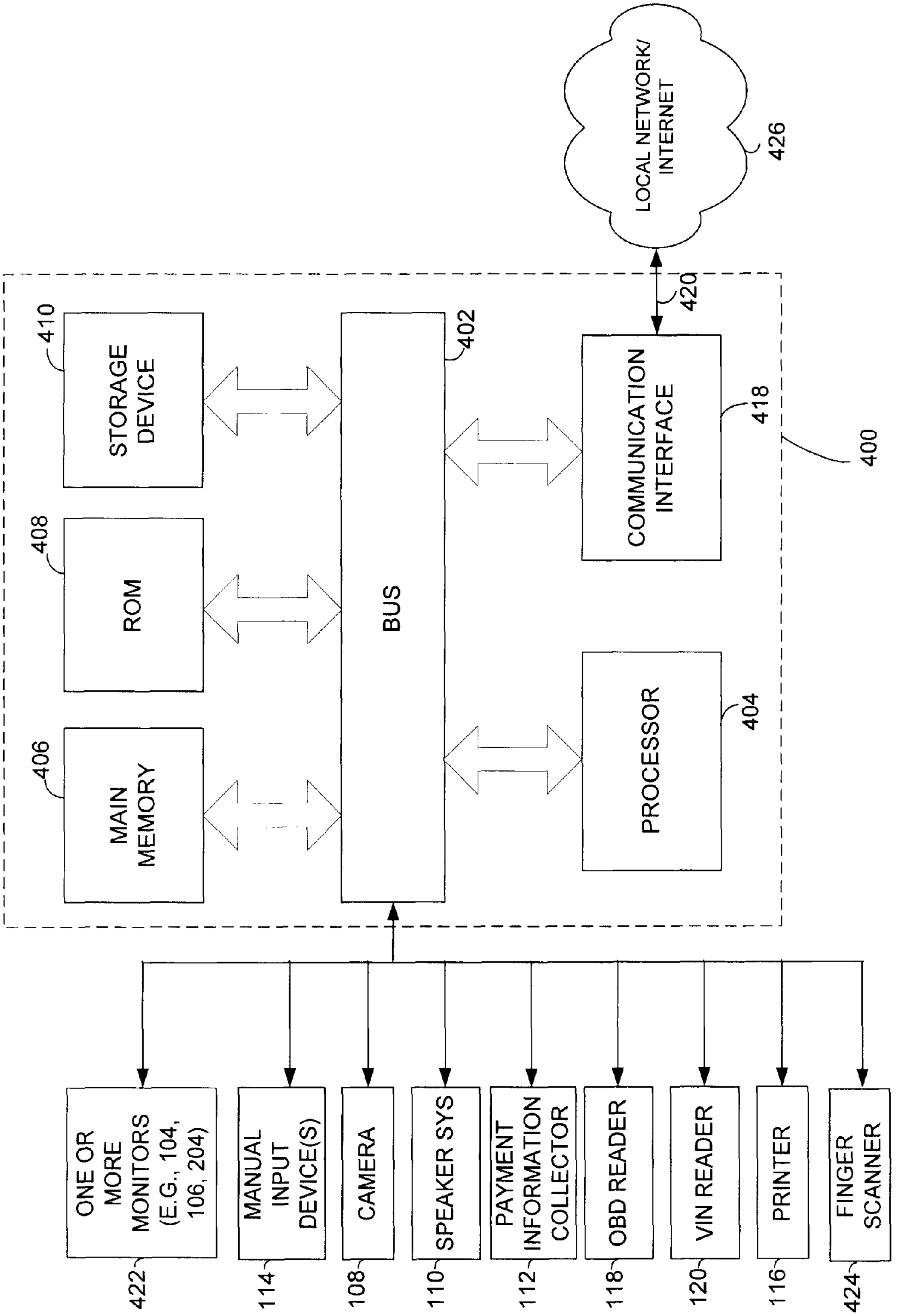
FIG. 4 is a block diagram illustrating one example of a computing device for use with the self-service OBD kiosk of FIGS. 1 and 2 in accordance with one embodiment of the present disclosure.

FIG. 4 illustrates an exemplary block diagram of computing device 400 as contained within the self-service OBD kiosk 100, 200 upon which one embodiment of the disclosure may be implemented. Computing device 400 may be any conventional computer system or any other suitable device or system that computes such as, but not limited to, one or more integrated circuits or packages. As illustrated, computing device 400 includes bus 402 or other communication mechanism for communicating information, and processor 404 coupled with bus 402 for processing information. Processor 404 may include one or more conventional processors, mircroprocessors, or processing devices as known in the art or may comprise any other suitable device such as, but not limited to, one or more ASICs, one or more DSPs, etc. For instance, processor 404 may be implemented using an Intel Pentium processor. As illustrated, computing device 400 also includes main memory 406, such as random access memory (RAM) or other dynamic storage device, coupled to bus 402 for storing information and instructions to be executed by a processor 404. Main memory 406 may be used for storing temporary variable or other intermediate information during execution of instructions to be executed by processor 404. Computing device 400 may further includes read only memory (ROM) 408 or other static storage device coupled to bus 402 for storing static information and instructions for processor 404. Storage device 410 such as a magnetic disk or optical disk, may further be provided and coupled to bus 402 for storing information and instructions.

With reference to FIGS. 1-4, computing device 400 may be coupled via bus 402 and one or more suitable interfaces or ports (not illustrated) such as a PCI or AGP interface or port to one or more OBD kiosk 100, 200 components such as one or more of: one or more monitors 422, one or more manual input devices 114, camera 108, speaker system 110, payment information collector 112, OBD reader 118, VIN reader 120, printer 116 and finger scanner 424. Although not specifically illustrated, each of the above-listed components may also include any necessary supporting hardware (e.g., circuitry), software and/or firmware that enables OBD kiosk 100, 200 and its processor 404 to communicate with each OBD kiosk 100, 200 component. For example, the one or more monitors 422 may include one or more frame buffers and may further require an additional graphics processing unit and an associated driver stored in main memory 406 or any other suitable memory to alleviate the burden associated with visual reproduction of images that would otherwise be felt by processor 404. Similarly, speaker system 110 may include one or more digital to analog converters, and amplifiers. It is recognized that the above-listed supporting hardware, software and/or firmware are merely exemplary and are not intended to limit the breadth of the present disclosure.

One or more monitors 422 may include one or more of: first monitor 104, second monitor 106 and integrated monitor and manual input device 204. Each of the first monitor 104 and second monitor 106 may be a cathode ray tube (CRT), a digital flag panel display (e.g., a plasma display, a LCD display) or any other any suitable display monitor capable of visibly reproducing video and graphic information. Alternatively, each of the first monitor 104 and second monitor 106 may be an integrated monitor and manual input device 204 such as any suitable touch screen monitor or any suitable device capable of visibly reproducing video and graphic information and also accepting user input on the same screen. As understood by one having ordinary skill in the art, integrated monitor and manual input device 204 may accept and detect user input via, for example, physical contact/pressure applied to the screen by way of a human appendage (e.g., an index finger) or a stylus (not illustrated). In one embodiment, integrated monitor and manual input device 204 provides a graphical user interface having a keyboard layout displayed for the user. Accordingly, a user may input data by using the screen as a keyboard. Similarly, integrated monitor and manual input device 204 may allow a user to enter one's signature using a stylus or using one's finger as a writing instrument. Each of the first monitor 104, second monitor 106 and integrated monitor and manual input device 204 may have any suitable display screen surface such as, but not limited to, glass or Plexiglas.

Manual input device 114 may include a keyboard, mouse, or any other suitable input device for communicating command selections to processor 404 and/or for controlling cursor movement on one or more of: first monitor 104, second monitor 106 and integrated monitor and manual input device 204. Speaker system 110 may include one or more speakers for suitable audible reproduction of, for example, audio instructions and messages to kiosk users during vehicle testing. Camera 108 may include any suitable video or still frame camera for communicating close-range video images or picture images of a kiosk user and/or the vehicle to processor 404. As understood, processor 404 may store the images in any suitable memory and may be useful for security purposes or for identification of the user, operator and/or vehicle. Payment information collector 112 may be a credit card reader or any suitable payment acceptor coupled via bus 402 for communicating or identifying (i.e., collecting) credit card or other suitable payment information about the kiosk user or vehicle owner to the computing device 400. This feature may be particularly relevant when the OBD kiosk 100, 200 is designed (e.g., tailored) for or used by a vehicle owner.

OBD reader 118 and VIN reader 120 may be any suitable reader used to obtain OBD system-generated information and VIN information regarding the particular vehicle under test. Printer 116 may be any suitable device used to generate, among other things, a vehicle inspection report (VIR) based upon the results of the self-service OBD test. Finger scanner 424 may be any suitable device (not specifically illustrated in FIGS. 1 and 2) used for identifying a vehicle owner or for identifying an inspector administering a vehicle test upon a given vehicle. Finger scanner 424 may be, in one embodiment, an integrated portion of the integrated monitor and manual input device 204 or may be a separate stand-alone component of the OBD kiosk 100, 200 like payment information collector 112. Finger scanner 424 may be particularly relevant to kiosks designed for approved trained inspectors or for vehicle owners and may be used as a password to log into the system or as a method of fraud detection. In one embodiment, kiosk users could be registered in advance by having a finger scan saved and thereby act as a password. In another embodiment, finger scanner 424 may be used to scan a user's fingerprint for storage with a vehicle inspection record as described below.

According to one embodiment of the disclosure, the self-service kiosk 100 utilizes computing device 400 to test vehicle engine and emission components by executing one or more sequences of one or more instruction commands contained in main memory 406 or any other suitable computer-readable medium. Such instructions may be read into main memory 406 from another computer-readable medium, such as storage device 410. Execution of the sequences of instructions contained in main memory 406 cause processor 404 to perform the process described herein. One or more processors in a multi-processing arrangement may also be employed to execute the sequences of instructions contained in main memory 406. In alternate embodiments, hard-wired or any other suitable dedicated or programmable circuitry may be used in place or in combination with software instructions to implement the invention. Thus, embodiments of the invention are not limited to any specific combination of hardware, circuitry and software.

The terms “computer-readable medium” and “memory,” as used herein, refer to any medium that participates in providing instructions to processor 404 for execution or to any medium that is capable of storing data. Such a medium may take many forms, including, but not limited to, non-volatile media, volatile media, and transmission media. Non-volatile media include, for example, optical or magnetic disks, such as storage device 410. Volatile media include dynamic memory, such as main memory 406, transmission media include coaxial cables, copper wire, and fiber optics, including the wires that comprise bus 402. Transmission media can also take the form of acoustic or light waves—such as those generated during radio frequency (RF) and infrared (IR) data communications. Common forms of computer-readable media include, for example, floppy disks, a flexible disk, hard disk, magnetic tape, any other magnetic medium, a CD-ROM, DVD, any other optical medium, punch cards-paper tape, any other physical medium with patterns or holes, a RAM, a PROM, a EPROM, a FLASHEPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk or any other suitable computer readable medium of a remote computer. The remote computer can load the instructions into its dynamic memory and send the instructions over a telephone line or any other suitable transmission line using, for example, a modem. In one embodiment, a modem local to computing device 400 may receive the data on a telephone line and use an infrared transmitter to convert the data to an infrared signal. An infrared detector coupled to bus 402 receives the data carried in the infrared signal and places the data on bus 402. Bus 402 carries the data to main memory 406, from which processor 404 retrieves and executes the instructions. The instructions received by main memory 406 may optionally be stored in any suitable memory (e.g., main memory 406 and/or storage device 410) either before or after execution by processor 404.

As suggested, computing device 400 may also include a communication interface 418 which provides a two-way data communication coupling to a network link 420 that is connected to a network (local or remote) and/or internet 426. For example, communication interface 418 may be an integrated services digital network (ISDN) card or a modem to provide a data communication connection to a corresponding type of telephone line or other suitable transmission line. As another example, communication interface 418 may be a local area network (LAN) card to provide a data communication connection to a compatible LAN. Wireless links and associated circuitry/equipment necessary for implementation may also be incorporated. In any such implementation, communication interface 418 may send and receive electrical, electromagnetic, optical or any other suitable signal that carries digital data streams representing various types of information.

Network link 420 typically provides data communication through one or more networks to other data devices. For example, network link 420 may provide a connection through a local network to a host computer or to data equipment operated by an Internet Service Provider (ISP). The ISP in turn provides data communication services through the Internet. The local network and Internet both use electrical, electromagnetic, optical or any other suitable signals that carry digital data or data streams.

Computing device 400 can send messages, and receive data, including program codes through the network(s), network link 420 and communication interface 418. In the Internet example, a server might transmit a requested code for an application program through the Internet, the ISP, the local network and communication interface 418. In accordance with this disclosure, one such downloaded application provides for the testing instructions for testing a vehicle’s engine and emissions components as described herein. The received code may be executed by processor 404 as it is received, and/or stored in a storage device 410, or other volatile or non-volatile storage for later execution. In this manner, computing device 400 may obtain an application code.

Although computing device 400 is described above as having the above-listed components, it is recognized that one or more components may not be needed or substituted with an equivalent component. For instance, storage device 410 may be omitted. Similarly, while computing device 400 is illustrated as having locally coupled components, it is recognized that one or more components may be remotely coupled to the computing device 400 over a network or over the internet (e.g., over local network/internet 426). It is further recognized that one or more OBD kiosk 100, 200 components such as, for example, printer 116 may also be remotely coupled to the computing device 400 over a network or over the internet (e.g., over local network/internet 426).

With respect to FIGS. 1-4, the self-service OBD kiosk 100 or 200 may be utilized to read and analyze OBD-II computer based systems often termed an Engine Control Unit (“ECU”) or a Powertrain Control Module (“PCM”) built into vehicles, thereby providing the owner with engine and emission data captured by the vehicle’s onboard system. In operation, the self-service OBD kiosk 100 or 200 may have a program loaded from storage device 210 or any data source (e.g., computer readable medium) internal or external to computing device 400 and subsequently generates and displays a graphical user interface on at least one of: first monitor 104, second monitor 106 and integrated monitor and manual input device 204. In one embodiment, the graphical user interface may include a welcome screen instructing the kiosk user to insert payment information using the payment information collector 112 or any suitable input mechanism such as manual input device 114 or integrated monitor and manual input device 204 in order to begin the engine and emissions inspection. In one embodiment, a credit card may be waved past or physically inserted into the payment information collector 112 as is well known in the art. In response, the OBD kiosk 100 or 200 receives and reads credit card information corresponding to the kiosk user or vehicle owner. After receiving and processing payment information, the application may generate a new screen on at least one of: first monitor 104, second monitor 106 and integrated monitor and manual input device 204, thereby providing the user with several options related to inspection of the vehicle under test. In one embodiment, the selections may be presented to the user by way of graphical buttons indicating, for example, help menus, data link connector finder instructions, or a command to begin the emissions inspection. A user may make a selection using at least one of: manual input device 114 and integrated monitor and manual input device 204.

By selecting a button entitled begin emissions inspection, the OBD kiosk 100 or 200 releases a locking mechanism securing the VIN reader 120 thereby allowing the user to capture VIN information on a vehicle under test. VIN reader 120 may be physically wired or coupled to OBD kiosk 100 or 200 or may be a wireless device. In one embodiment, the VIN reader 120 is a retractable code 39 bar code scanner that enables the user to scan VIN information from the windshield and dashboard of his vehicle. VIN reader 120 may also be a wireless bar code scanner utilizing any wireless standard including Bluetooth. Lastly, VIN reader 120 may also include a RFID (radio frequency identification) reader capable of reading VIN information stored in a RFID tag located on the vehicle. Regardless of the technology implemented in VIN reader 120, computing device 400 accepts the VIN information read from VIN reader 120. If VIN reader 120 is incapable of reading the VIN information, a user may manually input the VIN information using the manual input device 114 such as a keyboard or via integrated monitor and manual input device 204. After accepting VIN information, the application searches an appropriate vehicle lookup table ("VLT") file (located in any suitable memory of computing device 400 or in any other data source internal or external to computing device 400) to determine if the VIN and its related vehicle pertinent information is stored in the VLT file.

Assuming that the application finds a match in the VLT file, the vehicle pertinent information from the VLT file is displayed on at least one of: first monitor 104, second monitor 106 and integrated monitor and manual input device 204 and/or printed on printer 116. In one embodiment, the vehicle pertinent information may include the vehicle's make, model, year, engine size, number of cylinders, etc. and may be associated with the customer name, the last inspection date, etc. However, if no pre-existing entry is found for that particular VIN in the VLT file, then the application may use a decoder to generate the vehicle information from the VIN. In one embodiment, the decoder may correspond to the Polk VIN decoder by R.L. Polk and Company of Southfield, Mo. It is understood, however, that any VIN decoder capable of deciphering and interpreting a VIN can be used to generate the vehicle pertinent information.

As recognized, the OBD-II standard allows a variety of electrical signaling protocols indicating how information is transmitted over the vehicle's data link connector (DLC). Known protocols include: SAE J1850 PWM (used by many Ford vehicles), SAE J1850 VPW (used by many GM vehicles), ISO 9141-2 (used by many Chrysler, European and Asia vehicles), ISO 14230 KWP2000, and ISO 15765 CAN. Using one of these protocols, a vehicle can "communicate" with the OBD reader 118. In one embodiment, vehicle pertinent information includes the OBD-II protocol used by the vehicle. If the VLT includes this information, the OBD reader 118 and/or computing device 400 may be configured to read and/or interpret the OBD-related information transmitted over the DLC. In another embodiment, the user may be able to input the protocol used by the vehicle if known.

After the vehicle pertinent information associated with the customers of vehicle's VIN is displayed or printed, the application prompts the user to continue with the inspection. As such, the OBD kiosk 100 or 200 releases OBD reader 118 from a locking mechanism and prompts the user to connect the reader 118 to the vehicle's data link connector (DLC) to gather necessary OBD-related data recorded by the vehicle's OBD-II system (e.g., DTCs and vehicle readiness codes). OBD reader 118 may be physically wired or coupled to OBD kiosk 100, 200 or may alternatively be implemented as a wireless device. In one embodiment, for example, OBD reader 118 may be a retractable OBD reader 118. In another embodiment, OBD reader 118 may be a wireless device using any wireless standard including, but not limited to, Bluetooth. In yet another embodiment, OBD reader 118 may correspond to a RFID reader capable of reading data associated with the vehicle's onboard diagnostic system by way of a RFID tag.

Once the OBD reader 118 is connected to the vehicle's DLC, standard inspection processes can be performed if the signaling protocol has been ascertained (as explained above). If the protocol is neither present in the VLT, manually entered, or otherwise made available, the OBD reader 118 is programmed to ascertain the proper protocol by testing the current vehicle using a known test program stored by computing device 400. In one embodiment, the test program directs the OBD reader 118 to attempt communication with the vehicle's DLC with each known protocol until the proper protocol is found. Other known tests may also be employed. Once the protocol is ascertained by either manual input or by OBD reader 118, the VLT file is updated to speed up the time needed for subsequent inspections. In one embodiment, the protocol used during an inspection is saved or otherwise recorded in any suitable memory.

Standard inspection processes may include, among other inspection tests, a KOEO inspection (key-on, engine-off), a KOER inspection (key-on, engine-running) and another other suitable OBD inspection. As understood by those having ordinary skill in the art, diagnostic trouble codes ("DTC"), vehicle readiness codes, parameter identification ("PID") numbers and other suitable OBD-related date may be read by the OBD reader 118 during the inspection process and sent to computing device 400 for analysis of the engine and emission control features of the vehicle and/or storage. After a test completes, the kiosk user is prompted to disconnect the OBD reader 118 from the DLC and return it to the OBD kiosk 100 or 200.

In the above description, OBD kiosk 100 or 200 may prompt a kiosk user by way of graphical data presented on at least one of: first monitor 104, second monitor 106 and integrated monitor and manual input device 204. For example, visual images can be displayed to show how to connect the OBD reader 118 with the DLC of the vehicle. In one embodiment, Macromedia's Flash software is utilized to generate animated images for display on either monitor 104, 106. The prompts may also take the form of audio commands delivered by speaker system 110.

After returning the OBD reader 118, the OBD kiosk 100, 200 generates a test report in the form of a vehicle inspection report (VIR), displays the results on at least one of: first monitor 104, second monitor 106 and integrated monitor and manual input device 204 and optionally prints the VIR using printer 116. The test results may include data representing whether the vehicle passed the OBD inspection processes, and may also include any diagnostic trouble codes (DTCs), vehicle readiness codes, etc. received and read by the OBD reader 118. In one embodiment, the VIR may include the signature of the vehicle owner or the trained vehicle inspector. The signature may be provided during the inspection process using a stylus or one's finger as a writing instrument for integrated monitor and manual input device 204.

As the protocol used to inspect the vehicle may be stored in memory, the VIR may also indicate the protocol used to inspect the vehicle. In one embodiment, the VIR may also indicate whether there is any doubt as to the integrity of the inspection results due to the protocol used during inspection. The VIR may indicate concern regarding inspection integrity by comparing the recorded protocol used during inspection against a protocol used in a previous inspection for the same vehicle. If the protocols are the same, the VIR may indicate that the inspection is not fraudulent. If the protocols do not match, the VIR may indicate that the inspection may be fraudulent. Any other suitable comparison to the vehicle's previously used protocol or the vehicle's known protocol may be used to help detect fraudulent testing. Additionally, the VIR may include a list of repair facilities where a customer can take their vehicle to correct any problems in the engine and emission control systems.

Figure 5:
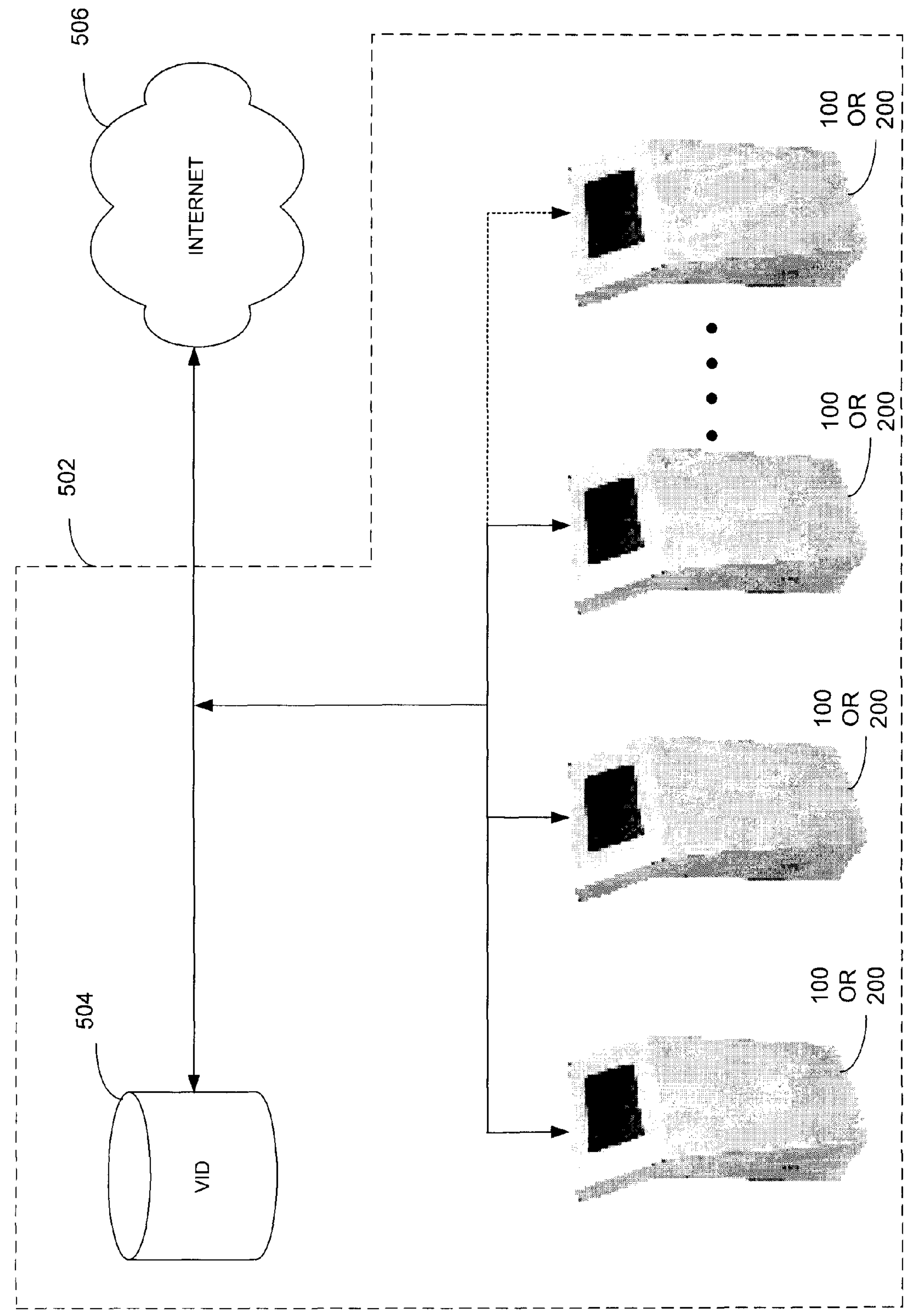
FIG. 5 is a block diagram illustrating one embodiment of a self-service OBD kiosk network.
Figure 6:
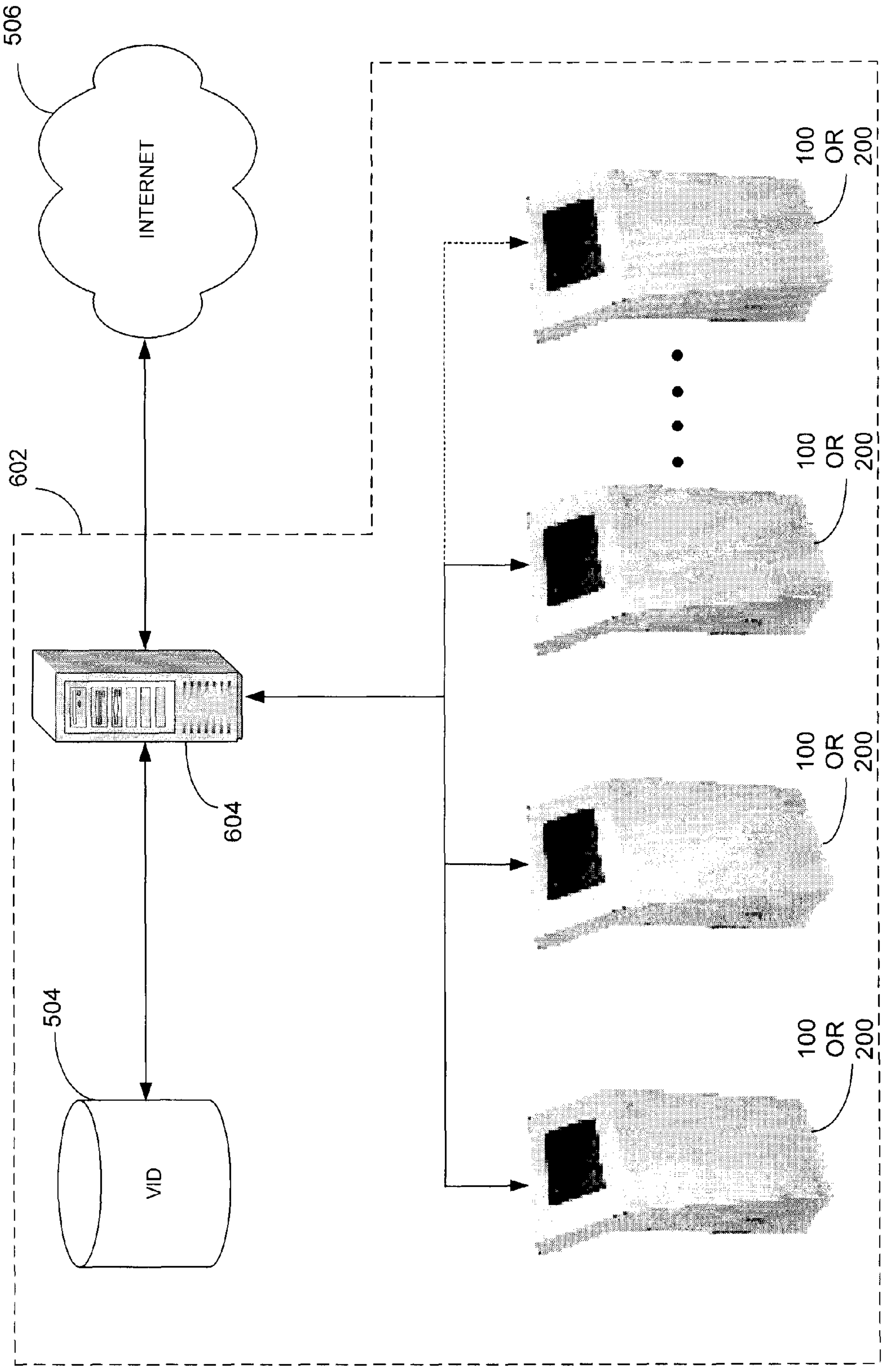
FIG. 6 is a block diagram illustrating a second embodiment of a self-service OBD kiosk network.

After the test is completed, the test record (the VIR) is stored in a vehicle interface database which may be part of computing device 400 (i.e., stored in storage device 410 or any other memory storage device) or may be a separately maintained central vehicle interface database (see FIGS. 5-6).

In one embodiment, RF technology may be utilized to not only send data to one or more RF readers on the OBD kiosk 100, 200 but may also be utilized to write test result data and other vehicle-specific information from the OBD kiosk 100, 200 to a RFID tag on the vehicle. For instance, a vehicle undergoing an engine and emissions test may have an RFID tag or transponder located thereon. Among other things, the RFID tag may relay information to the OBD kiosk 100, 200 indicating the VIN, OBD-related data or other vehicle-related information as described above. While the OBD kiosk 100, 200 described above utilized a stand-alone VIN-reader 120 and a stand-alone OBD reader 118 as separate devices, an OBD kiosk 100, 200 may also be equipped with a single combination VIN an OBD reader (not illustrated) such as a single RFID reader capable of reading any information contained on a vehicle's RFID tag. In one embodiment, the application working in conjunction with the RFID reader may continuously scan its environment for RFID tags and automatically open an RF portal for data transfer after a user enters their payment and/or other personal information. Additionally, the OBD kiosk 100, 200 may have the ability to write data back to the vehicle's RFID tag. In such an embodiment, the OBD kiosk 100 may be programmed to write the test results back to the RFID tag such that the tag contains a history of the vehicle.

While FIGS. 1-2 illustrate stand-alone self-service OBD kiosks 100, 200 FIG. 5 illustrates a self-service OBD kiosk network 500 including one or more OBD kiosks 100 and/or one or more OBD kiosks 200 and a central vehicle interface database (VID) 504 as part of a secure inspection network 502. Secure inspection network 302 may be a privately maintained network operably connected to the Internet 506 for remote access. In one embodiment, each of plurality of OBD kiosks 100, 200 comprise computing devices similar to computing device 400 illustrated in FIG. 4. Each of the OBD kiosks 100, 200 may be loaded with Microsoft's .net framework version 2.0 or any other software platform enabling each of the OBD kiosks 100, 200 to interact in a web-based environment. By utilizing these .net and other web-based technologies, network 500 is scalable and easily adaptable to future growth. The central VID 504 may be any external database accessible by each of the OBD kiosks 100, 200 and other web-based clients on the Internet. In one embodiment, the central VID 504 is implemented using a Microsoft SQL Server as a backend stand-alone device.

In web-based network 500, each of the OBD kiosks 100, 500 may communicate with the central VID 504 using the services of various .net technologies such as ASP.net, VB.net, C#, XML and other Web services. In this manner, each of the OBD kiosks 100, 200 can issue requests for data stored in the central VID 504. For instance, an OBD kiosk 100 or 200 may issue a request for vehicle-related information associated with a vehicle's VIN. In another embodiment, an OBD kiosk 100 or 200 may issue a request for information regarding a vehicle's previous testing history. While each of the OBD kiosks 100, 200 may receive data from the central VID 504, each kiosk 100, 200 may also transmit data thereto. As described herein, an OBD kiosk 100, 200 may store a vehicle's VIN or other related information (i.e., VLT-type information) in the central VID 504. Alternatively, an OBD kiosk 100 or 200 may store test results to the central VID 504. In another embodiment, the central VID 504 is capable of storing information regarding legacy emission tests such as tailpipe tests in order to provide a complete history of a vehicle's emissions compliance.

By maintaining a secure inspection network 502, remote users located elsewhere on the Internet 506 can selectively access data stored within the secure inspection network 502 by using standard internet protocols. Other benefits include the ability to: add or remove kiosks from the network 500; view camera data at a selected kiosk from a remote location; send and retrieve VLT files from each kiosk 100, 200 or central VID 504 (and associate scheduling); perform software updates remotely; use the back-end VID 504 to incorporate form-based authentication with options for role management; view canned reports remotely or at individual kiosks 100, 200 indicating the number of tests performed between a given date range or the number of missed appointments; and selectively deactivate kiosks from remote locations.

FIG. 6 illustrates another example of a self-service OBD network 600 including a secure inspection network 602 having one or more OBD kiosks 100 and/or one or more OBD kiosks 200, a central VID 504 and a server 604. In general the network 600 performs the same functions as described with respect to the self-service OBD network 500. However, one of ordinary skill in the art will recognize that server 604 provides additionally functionality to the network 600. Among other benefits recognized, server 604 may serve as a back up to VID 504 and provide additional routing functions not generally recognized in the network 600.

Among may other benefits realized, the use of computing device 400 provides a easy opportunity to make updates to and/or additions to the inspection software/application program. As further recognized, when networked in any suitable networked environment (e.g., as in FIGS. 5-6), OBD kiosks 100, 200 may be remotely updated by a remote computer or computing device. Similarly, the networked environment provides the opportunity for remote monitoring of the OBD kiosks 100, 200.

Figure 7:
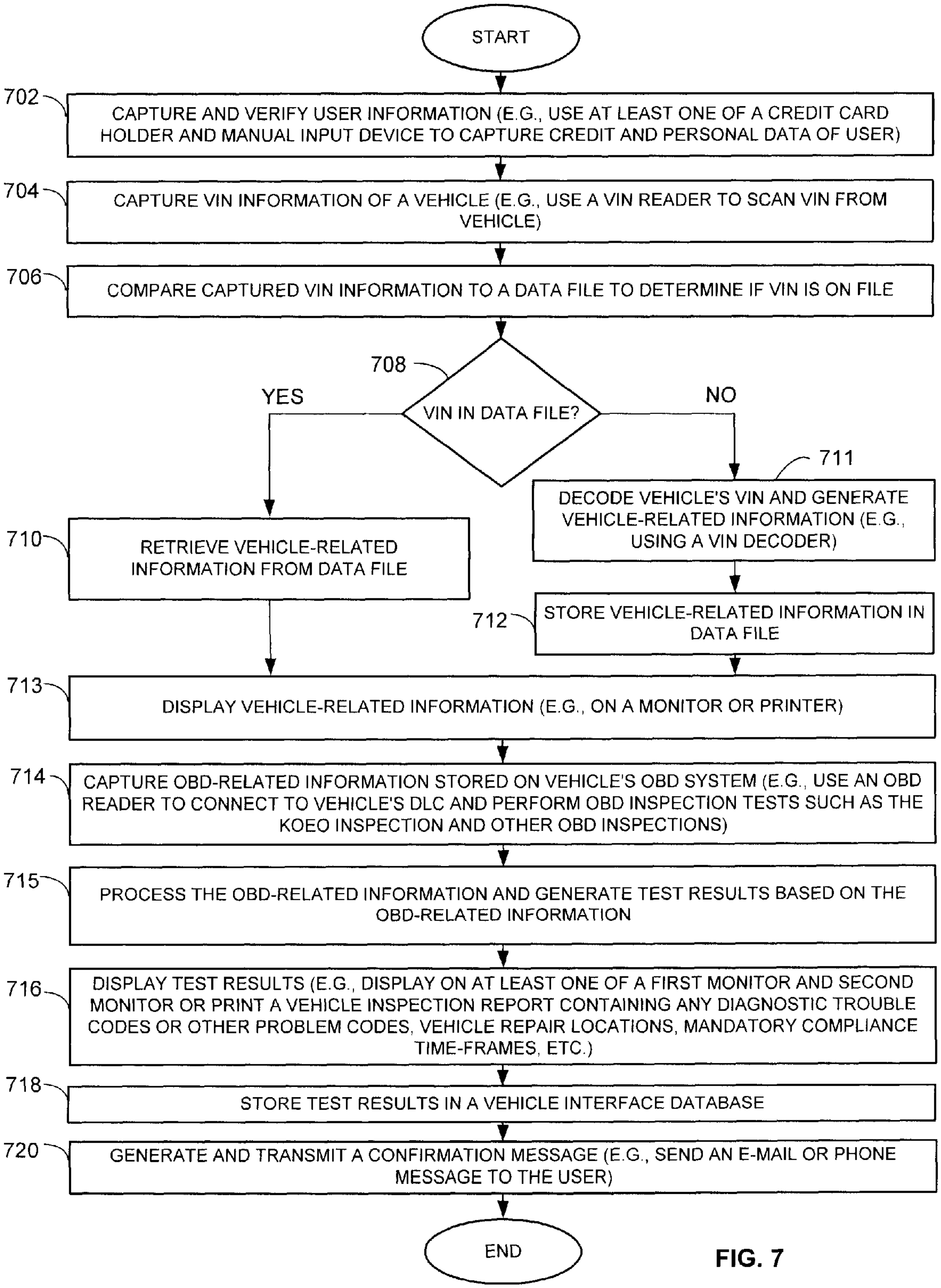
FIG. 7 is a flow chart illustrating one method of using a self-service OBD kiosk as depicted in FIGS. 1-6.

FIG. 7 illustrates one method of testing vehicle emissions and engine controls using a self-service OBD kiosk such as the OBD kiosks illustrated in FIGS. 1-6. The method begins with block 702 wherein user information such as, but not limited to, credit card information and contact information of the kiosk user are captured and verified. For example, in one instance an OBD kiosk 100 or 200 may prompt a user to input a credit card into payment information collector 112 for credit verification. In another instance, OBD kiosk 100, 200 may ask the user to input personal contact information for record-keeping and to subsequently notify the user of the testing results. The process proceeds with block 704 where VIN information of a vehicle is captured. In one embodiment, a VIN reader 120 may be provided to scan the VIN from the vehicle's windshield and dashboard. As described herein, VIN reader maybe a bar code scanner connected via cable to the OBD kiosk, or alternatively a wireless bar code scanner. In another embodiment, VIN reader 120 may include an RFID reader programmed to capture information transmitted via an RFID tag or transponder present on the vehicle representing the vehicle's VIN.

After capturing the vehicle's VIN information, the process continues by comparing the VIN information to a data file to determine if the VIN is on file, block 706. The data file may be a locally stored data file stored locally within computing device 400 of OBD kiosk 100, 200 or may be an other internal or external data source accessible by the OBD kiosk 100, 200. If the method determines that the VIN is not in the data file, block 708, the VIN is decoded and vehicle-related information is generated, block 711. In one instance, the VIN is decoded using a commercially available decoder. Vehicle-related information may correspond to, among other things, the vehicle year and the make and model of the vehicle. After the vehicle-related information is generated, it is stored in the data file, block 712, for subsequent use. If however, the VIN is present in the data file, block 708, the method retrieves vehicle-related information from the data file as illustrated in block 710.

Once the vehicle-related information is obtained, it is displayed to the user in block 713. For example, graphical data may be displayed on a monitor. Alternatively, the vehicle-related information may be printed using a printer. Next, the method captures OBD-related information stored on the vehicle's OBD system, block 714 In one instance, an OBD reader 118 connected to the OBD kiosk 100, 200 via a cable is operatively connected to the vehicle's DLC to gather information from OBD inspection tests such as the KOEO and any other suitable OBD tests. Alternatively, OBD reader 118 may include a wireless device or an RFID reader configured to gather OBD-related information.

After gathering the information, the method processes it and generates test results based therefrom, block 715. In one embodiment, this corresponds to interpreting the DTCs and generating test results understandable to the user. Next, the method displays the test results, block 716, using any known technique such a but not limited to generating display information in a monitor or printing data using a printer. The method subsequently stores the test results in a vehicle information database, block 718. In one embodiment, the vehicle information database is a separate back-end database such as Microsoft SQL Server 2003. However, it is recognized that the database may be any external database cable of storing test results and other vehicle-related information. Additionally, the vehicle information database may be located within computing device 400 of an OBD kiosk 100, 200, if desired. Lastly, the method generates and transmits a confirmation message for the user in block 720. For instance, the OBD kiosk 100, 200 may generate an email or phone message based on the personal information captured in block 702. In one embodiment, the email or phone message may indicate that an engine and emissions test was successfully completed on a given date. As recognized by one having ordinary skill, the email or phone message may be generated using computing device 400 and may be sent over any suitable network or over the internet e.g., network/internet 426.

The above detailed description of the invention and the examples described therein have been presented for the purposes of illustration and description only and not by limitation. For example, although the above disclosure is described with respect to the OBD-II standard, it is recognized that the above disclosure may equally be adapted to any other suitable self-diagnostic, on-board vehicle system. It is therefore contemplated the present invention cover any and all modifications, variations, or equivalents that fall in the spirit and scope of the basic underlying principles disclosed above and claimed herein.

What is claimed is:

1. A self-service on-board diagnostics kiosk for testing vehicle emissions and engine controls of a vehicle comprising:

a cabinet having at least a touch screen monitor for displaying information, a printer in operative communication with the touch screen monitor for printing documents, the cabinet including a climate control system for controlling the climate inside the cabinet and an RFID reader fro wirelessly capturing vehicle specific information from the RFID tag of a vehicle, wherein the vehicle specific information comprises vehicle information number (VIN) information and on board diagnostics (OBD) data and a computer system included in the cabinet and being responsive to the touch screen monitor, the computer system having a processor in operative communication with a network link for providing data communication through one or more networks, the network link being in operative communication with the climate control system for providing data related to climate inside the cabinet, the RFID reader to capture the VIN information and OBD data obtained from the RFID tag of the vehicle by the RFID reader, wherein the computer system generates a test report having test data based on at least one of the vehicle information number and the OBD data, and displays the results of the test report using at least one of the touch screen monitor and the printer.

2. The self-service on-board diagnostics kiosk according to claim 1, wherein the processor communicates with the climate control system to maintain the climate inside the cabinet within a predetermined temperature under adverse environmental conditions.

3. The self-service on-board diagnostics kiosk according to claim 1, wherein the climate control system includes an internal heater and/or air condition unit.

4. The self-service OBD kiosk according to claim 3 wherein the processor controls the internal heater and/or air conditioning unit to control the humidity inside the cabinet.

5. The self-service on-board diagnostics kiosk according to claim 4, wherein the OBD reader receives and reads the fingerprint of the user.

6. The self-service on-board diagnostics kiosk according to claim 4 wherein the processor is in operative communication with a vehicle interface database that includes at least one fingerprint for comparison with the fingerprint of the user captured by the computer system.

7. The self-service on-board diagnostics kiosk according to claim 6, wherein the computer system determines whether the fingerprint of a user in the vehicle interface database is the same as the fingerprint of the user captured by the computer system.

8. The self-service on-board diagnostics kiosk according to claim 7, wherein the computer system prevents operation of the kiosk if the fingerprint of the user in the vehicle interface database is not the same as the fingerprint of the user captured by the computer system.

9. The self-service on-board diagnostics kiosk according to claim 7, wherein the computer system permits operation of the kiosk if the fingerprint of the user in the vehicle interface database is the same as the fingerprint of the user captured by the computer system.

10. The self-service on-board diagnostics kiosk according to claim 4 wherein the finger scanner is incorporated into the touch screen monitor having a screen which detects the physical contact applied to the touch screen monitor by way of a human appendage to capture the fingerprint of the user.

11. The self-service on-board diagnostics kiosk according to claim 4, wherein the fingerprint of the user is stored in relation to a vehicle inspection record associated with the vehicle.

12. A self-service OBD kiosk for testing vehicle emissions and engine controls comprising:

a cabinet having at least a touch screen monitor for displaying information and a printer in operative communication with the touch screen monitor for printing documents, the cabinet including a network link for providing communication through one or more networks, the cabinet including a climate control system for controlling the climate inside the cabinet and an RFID reader for wirelessly capturing vehicle specific information from the RFID tag of a vehicle, wherein the vehicle specific information comprises vehicle information number (VIN), the cabinet further including an OBD reader adapted for operative communication with an OBD module of the vehicle for capturing OBD data from the vehicle; and a computer system included in the cabinet and being responsive to the touch screen monitor, the computer system having a processor in operative communication with the network link for downloading to the processor an application having testing instructions for testing a vehicle's engine and emission components which are executed by the processor, and the RFID reader to capture the VIN information obtained by the RFID tag and the OBD reader to capture the OBD data obtained from the OBD module of the vehicle, wherein the computer system generates a test report having test data based on at least one of the vehicle information number and the OBD data, and displays the results of the test report using at least one of the touch screen monitor and the printer.

13. A method for testing vehicle emissions and engine controls of a vehicle comprising:

providing a self-service OBD kiosk for testing vehicle emissions and engine controls comprising:

a cabinet having at least a touch screen monitor for displaying information, the cabinet including a network link for communicating data through one or more networks and the cabinet including a climate control system for controlling the climate inside the cabinet and an RFID reader for wirelessly capturing vehicle specific information from the RFID tag of a vehicle, wherein the vehicle specific information comprises vehicle information number (VIN), the cabinet further including an OBD reader adapted for operative communication with an OBD module of the vehicle for capturing OBD data from the vehicle; and a computer system included in the cabinet and being responsive to the touch screen monitor, the computer system having a processor in operative communication with a network link for providing data communication through one or more networks, the network link being in operative communication with the processor for receiving vehicle emissions test results transmitting a communication generated by the processor through the network link regarding the vehicle emissions test results, and the RFID reader to capture the VIN information obtained by the RFID tag and the OBD reader to capture the OBD data obtained from the OBD module of the vehicle, wherein the computer system generates a test report having test data based on at least one of the vehicle information number and the OBD data, and displays the results of the test report using at least one of the touch screen monitor and the printer.

14. The method of claim 13, wherein the communication is a phone message regarding the vehicle emissions test results.

15. The method of claim 13, wherein the communication is an email regarding the vehicle emissions test results

* * * * *

UNITED STATES PATENT AND TRADEMARK OFFICE

CERTIFICATE OF CORRECTION

PATENT NO. : 7,925,399 B2
APPLICATION NO. : 11/535464
DATED : April 12, 2011
INVENTOR(S) : David Arthur Comeau et al.

It is certified that error appears in the above-identified patent and that said Letters Patent is hereby corrected as shown below:

Col. 1, line 9: "from to" should read --from--

Col. 2, line 67: "exits" should read --exists--

Col. 3, line 53: "one: of" should read --one of:--

Col. 4, line 21: "printer" should read --printer 116--

Col. 5, line 19: "may further includes" should read --may further include--

Col. 12, line 30: "additionally functionality" should read --additional functionality--

Col. 12, line 34: "Among may other" should read --Among many other--

Col. 12, line 35: "provides a easy" should read --provides an easy--

Col. 12, line 58: "VIN reader maybe" should read --VIN reader 120 may be--

Col. 12, line 58: "via cable" should read --via a cable--

Col. 13, line 1: "an other" should read --another--

Col. 13, line 19: "block 714" should read --block 714.--

Col. 13, line 31: "such a" should read --such as--

Col. 13, line 37: "cable" should read --capable--

Signed and Sealed this
Thirtieth Day of October, 2012

David J. Kappos
*Director of the United States Patent and Trademark Office*

Col. 14, line 4 (claim 1, line 9): “fro” should read --for--

Col. 16, line 32 (claim 15, line 2): “results” should read --results.--